though the workpiece 10 is randomly placed upon an inclined
United States Patent Office 3,487,909
Patented Jan. 6, 1970

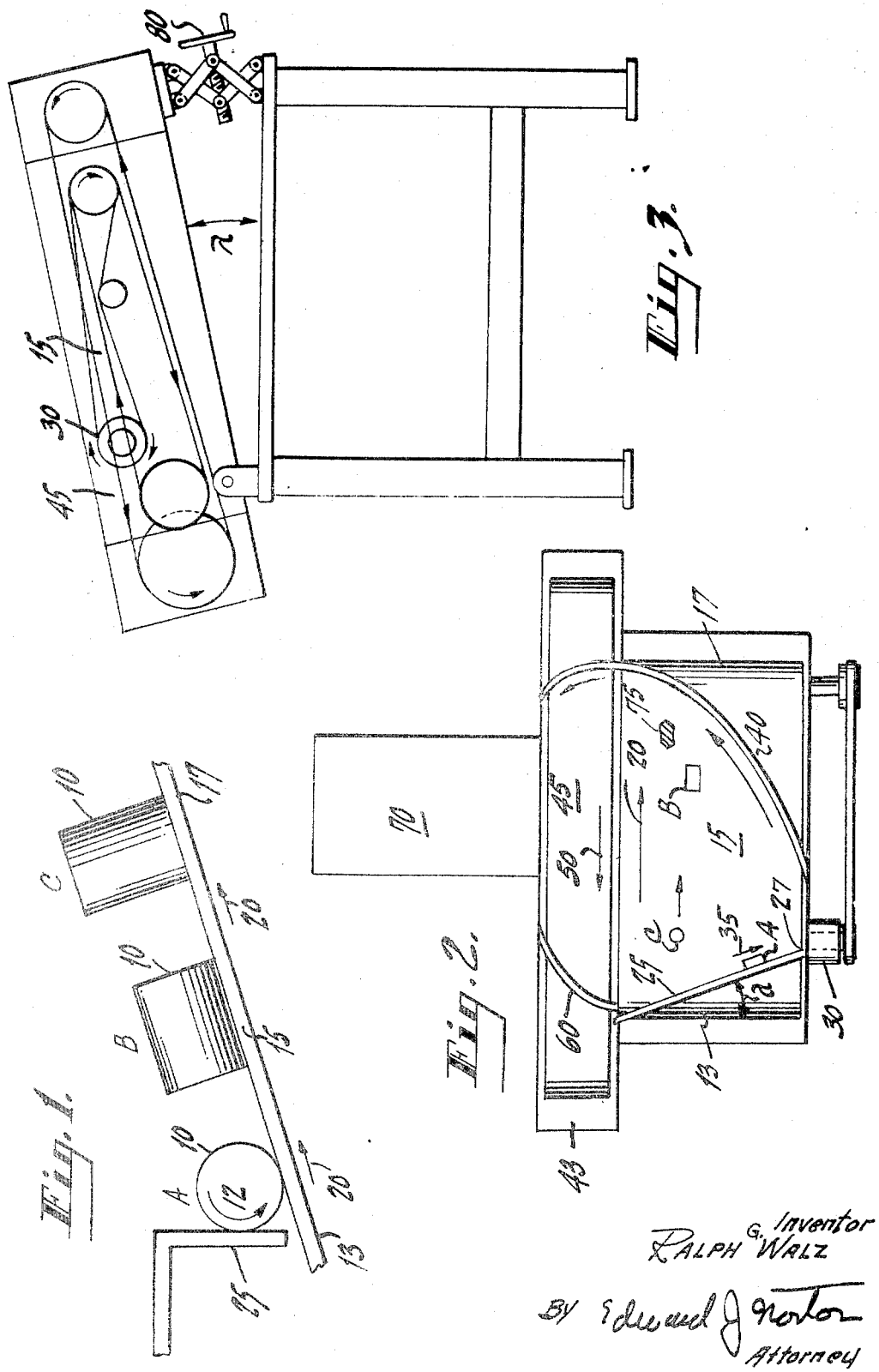

3,487,909
ARTICLE HANDLING APPARATUS
Ralph G. Walz, Birmingham, Mich., assignor to
RCA Corporation, a corporation of Delaware
Filed Dec. 26, 1967, Ser. No. 693,255
Int. Cl. B65g *47/24*
U.S. Cl. 198—33                                    13 Claims

ABSTRACT OF THE DISCLOSURE

Disclosed is apparatus for orienting and feeding cylindrical articles designed to utilize the friction free property exhibited by such articles when they are permitted to rotate about their longitudinal axis, along the length of an inclined plane.

BACKGROUND OF THE INVENTION

In the course of modern production techniques it is often desirable to deliver a workpiece to a selected station within an automated process, in a predetermined orientation, for incorporation into that process. Furthermore, where the surfaces of the workpiece to be so delivered have been prefinished, for example by polishing or plating, it is often desirable that the workpiece be handled in a manner whereby the integrity of the finished surface is insured. Many machines exist today which function to perform such a result. Generally, these machines make use of difference in the overall physical configuration of the workpiece as the basis for determining the proper orientation; i.e., they are able to distinguish between the length, width, and height of the workpiece. However, where the workpiece is cylindrical in shape, and particularly where it has a length which approximates its diameter, the problem of maintaining the proper orientation is compounded. This is because the basis of selection becomes obscured due to the fact that the overall lateral dimensions of the object, i.e., length, width and height, approximates the overall lateral dimensions of a cube. As a result, quit often the workpieces are delivered to the work station in improper alignment.

SUMMARY OF THE INVENTION

The present invention relates to apparatus for feeding, in a predetermined orientation, a cylindrical workpiece and, more particularly, to apparatus for feeding a cylindrical workpiece having a dimensional length approximating its diameter. The apparatus is designed for high speed feeding of such workpieces and incorporates means for controlling the speed at which the workpieces may be delivered. Furthermore, the apparatus accomplishes the forementioned results without marring the finish which exists on the surfaces of the workpiece being delivered.

Basically the apparatus is designed to utilize the friction free property which a cylindrical article exhibits when it rotates about its longitudinal axis. When placed upon an inclined conveyor belt, in a manner whereby the longitudinal axis of the workpiece is approximately perpendicular to the direction of conveyor movement, the cylindrical workpiece will have a tendency to rotate about its longitudinal axis in a direction counter to the movement of the conveyor. If a restraining bar or similar means is properly disposed at the base of the inclined conveyor, the workpiece will rotate in coordination with the conveyor about its longitudinal axis, and remain in situ with relation to the restraining means. By properly positioning the restraining means the workpiece can be guided by the motion of the belt to move in a desired direction and at a desired speed. Furthermore, by altering the angle of incline of the conveyor belt, the speed at which the workpiece advances along the forementioned restraining means in the desired direction can also be controlled.

According it is an object of the present invention to provide apparatus for feeding cylindrical workpieces to a work station in a predetermined orientation.

Another object is to provide such apparatus wherein the workpiece can be handled in a manner whereby the integrity of the finish upon its surfaces is maintained.

An additional object is to provide apparatus for feeding cylindrical workpieces in a predetermined orientation where the length of the workpiece approximates its diameter.

A further object is to provide such apparatus wherein the speed at which the workpieces are delivered to the work stations can be adjusted to suit the needs of the particular process.

DESCRIPTION OF THE FIGURES AND PREFERRED EMBODIMENT

The foregoing objects, as well as additional objects and advantages of the present invention, will become more readily apparent when the following specification is read in conjunction with the accompanying figures in which like reference numerals refer to like elements and wherein:

FIG. 1 is representative of the various positions which a cylindrical workpiece will assume when randomly placed upon an inclined moving conveyor belt;

FIG. 2 is a top view of apparatus in accordance with one embodiment of the present invention; and FIG. 3 is a side elevation of the apparatus shown in FIG. 2.

Turning now to a description of a preferred embodiment as represented by the attached figures, when a cylindrical workpiece 10 is randomly placed upon an inclined conveyor belt 15, it may assume any one of a number of positions. Generally however, particularly if the belt 15 has a direction of motion 20 toward the peak 17 of the incline, the workpiece 10 will have a tendency to assume one of three positions: i.e., its longitudinal axis perpendicular to the direction of conveyor movement with the workpiece resting on its cylindrical surface, as represented by workpiece A; its longitudinal axis parallel to the direction of conveyor movement with the workpiece resting on its cylindrical surface, as represented by workpiece B; or with its longitudinal axis perpendicular to the direction of conveyor movement with the workpiece resting on one of its base surfaces as represented by workpiece C.

It may be seen that if the three workpieces A, B and C shown in FIG. 1 were to be placed upon an inclined conveyor belt 15 moving in the direction indicated by the arrow 20, workpieces B and C would be in frictional contact with the surface of the conveyor belt 15 and be carried toward the peak 17 of the incline. Workpiece A on the other hand would present a substantially friction free surface and would not move toward the peak 17 of the incline, but rather would tend to rotate about its axis in a direction 12 counter to that of the conveyor movement 20 and, resultingly, would roll toward the base 13 of the incline. To prevent the workpiece A from rolling off the conveyor 15 upon reaching the base 13 of the incline, and appropriately positioned restraining means 25 is placed at the base 13 thereof.

FIGS. 2 and 3 are representative of apparatus built in accordance with a preferred embodiment of the present invention. As shown therein, a first inclined conveyor 15 is permitted to operate in the fashion of an endless belt having a direction of motion 20 toward the peak 17 of the incline. A restraining bar 25 is positioned at the base 13 of the inclined conveyor 15 to retard the downward rolling workpieces A. The restraining bar 25 is positioned at an angle α relative to the conveyor belt 15, and has its upper most end 27 disposed adjacent to a rotary feed tube 30. Workpieces placed upon the conveyor feed belt 15 which assume a position such as that of workpieces A in FIG. 1 will roll down the incline until they come in contact with the restraining bar 25. Thereupon they will rotate 12 about their longitudinal axis and proceed to travel along the path 35 delineated by the restraining bar 25 toward the rotary feed tube 30 which is rotating in the same direction as the workpiece. Upon reaching the entrance of the rotary feed tube 30 they proceed thereinto and are delivered via appropriately coupled means (not shown) to the desired work stations coupled thereto. While it has been found that the apparatus will operate satisfactorily with a stationary feed tube, the rotating motion has been found to provide an added benefit in that it insures proper orientation of the delivered workpiece by rejecting any piece which attempts to enter it that is not properly oriented and therefor not rotating in proper fashion.

Workpieces such as those depicted as B and C in FIG. 1 which are not oriented so as to provide a friction free contact with the surface of the inclined conveyor, will be carried toward the peak 17 of the incline by the moving feed belt. Upon approaching the peak 17 of the incline a guide bar 40 diverts these pieces onto a return belt 45 which is positioned adjacent to the feed belt 15 but moves in an opposite direction 50 with reference thereto; i.e., the direction of motion of the return belt being toward the base 43 of the incline. Workpieces which are diverted onto the return belt 45 are conveyed thereby toward the base 43 of the incline regardless of their orientation. As they approach the base they are then directed by means of a second guide bar 60 back onto the feed belt 15 and the process of selection repeated until all the workpieces 10 are fed to the appropriate work station, in proper orientation, via the rotary feed tube 30. By coupling a storage hopper 70 to a parts level detector 75 which may be situated toward the upper portion of the feed belt 15, automatic feeding of parts can be attained whereby the hopper 70 will discharge workpieces for delivery in response to a signal by the parts level detector 75 indicating the need therefor.

Furthermore, it has been found that the speed at which the workpieces 10 are delivered to the work stations via the rotary feed tube 30 may be varied in a number of ways. For example, the angle of inclination λ of the inclined feed belt 15 may be varied; or the angle α at which the restraining bar 25 is positioned may be varied; or the speed at which the inclined feed belt 15 moves may be varied. Generally, in light of the fact that a variation in the angle α will require an adjustment in position of the rotary feed tube 30, the more desirable methods of varying the speed of delivery of the workpieces will be to vary the angle of conveyor incline λ or the speed of conveyor movement. In FIG. 3, means for adjusting the angle of incline is represented by the extendable crank operated structure 80. Tests carried out on the apparatus shown in FIGS. 2 and 3 have resulted in the satisfactory feeding of workpieces at rates as high as 30,000 parts per hour.

What is claimed is:
1. Apparatus for orienting cylindrical workpieces comprising,
an inclined feed belt to which said workpieces are delivered in random orientation, said belt moving in a direction toward the peak of incline, those of said workpieces having their longitudinal axis disposed substantially parallel to the width of said belt tending to roll down said incline, the remainder of said workpieces being conveyed toward the peak of said incline, and
guide means positioned substantially across the width of said belt and below the point upon said belt to which said workpieces are randomly delivered, said guide means having one of its ends disposed at a higher elevation along said incline than its other end,
said guide means operating to restrain said rolling workpieces when they make contact therewith and further operating to guide said workpieces so restrained along said moving inclined belt towards said elevated end of said guide means.

2. Apparatus for orienting cylindrical workpieces as specified in claim 1 further comprising,
means for diverting said remainder of workpieces from said belt and redelivering them to said belt in random orientation.

3. Apparatus as defined in claim 1 further comprising means for altering the angle of inclination of said inclined feed belt.

4. Apparatus as defined in claim 1 further comprising means for altering the speed of said inclined feed belt.

5. Apparatus for orienting and feeding cylindrical workpieces comprising,
an inclined feed belt to which said workpieces are delivered in random orientation, said belt moving in a direction toward the peak of incline, those of said workpieces having their longitudinal axis disposed substantially parallel to the width of said belt tending to roll down said incline, the remainder of said workpieces being conveyed toward the peak of said incline,
means for delivering said workpieces to said feed belt,
guide means positioned substantially across the width of said belt and below the point upon said belt to which said workpieces are delivered, said guide means having one of its ends disposed at a higher elevation along said incline than its other end,
said guide means operating to restrain said rolling workpieces when they make contact therewith and further operating to guide said workpieces so restrained along said moving inclined belt towards said elevated end of said guide means, and
means disposed adjacent to said elevated end of said guide means, said means adapted to receive and convey said guided workpieces from said feed belt to a predetermined point of discharge.

6. Apparatus for orienting and feeding cylindrical workpieces as specified in claim 5 wherein said adjacent means more specifically comprises,
a rotating feed tube disposed adjacent to said elevated end of said guide means, said tube adapted to receive said guided workpieces from said moving feed belt at said elevated end of said guide means.

7. Apparatus as defined in claim 5 further comprising means for altering the angle of inclination of said inclined feed belt.

8. Apparatus as defined in claim 5 further comprising means for altering the speed of said inclined feed belt.

9. Apparatus for orienting and feeding cylindrical workpieces comprising,
an inclined feed belt to which said workpieces are delivered in random orientation, said belt moving in a direction toward the peak of incline, those of said workpieces having their longitudinal axis disposed substantially parallel to the width of said belt tending to roll down said incline, the remainder of said workpieces being conveyed toward the peak of said incline,
means for delivering said workpieces to said feed belt,
a restraining bar positioned substantially across the width of said belt and below the point upon said belt to which said workpieces are delivered, said restraining bar having one of its ends disposed at a higher elevation along said incline than its other end, said bar operating to restrain said rolling workpieces when they make contact therewith and further operating to guide said workpieces so restrained along said moving inclined belt towards said elevated end of said restraining bar, means disposed adjacent to said elevated end of said restraining bar, said means adapted to receive and convey said guided workpieces from said feed belt to a predetermined point of discharge, a second belt disposed adjacent to said inclined feed belt, said second belt having a direction of motion substantially opposite to that of said feed belt, means for diverting said remainder of workpieces from said feed belt to said second belt, and means for directing said diverted remainder of workpieces from said second belt back to said feed belt.

10. Apparatus for orienting and feeding cylindrical workpieces as defined in claim 9 wherein said adjacent means more specificaly comprises, a rotary feed tube disposed adjacent to said elevated end of said restraining bar, said tube adapted to receive said guided workpieces from said moving feed belt at said elevated end of said restraining bar.

11. Apparatus as defined in claim 9 further comprising means for altering the angle of inclination of said inclined feed belt.

12. Apparatus as defined in claim 9 further comprising means for altering the speed of said inclined feed belt.

13. Apparatus as defined in claim 9 further comprising sensing means adapted to sense the need for supplying additional workpieces to said feed belt, said delivery means operating to fulfill said need in response to a signal supplied to it from said sensing means.

References Cited

UNITED STATES PATENTS 2,956,665    10/1960    Arlin _____ 198—33

EDWARD A. SROKA, Primary Examiner